J. E. DICK.
HAND TRANSIT.
APPLICATION FILED MAY 23, 1918.
1,308,050.
Patented July 1, 1919.
2 SHEETS—SHEET 1.
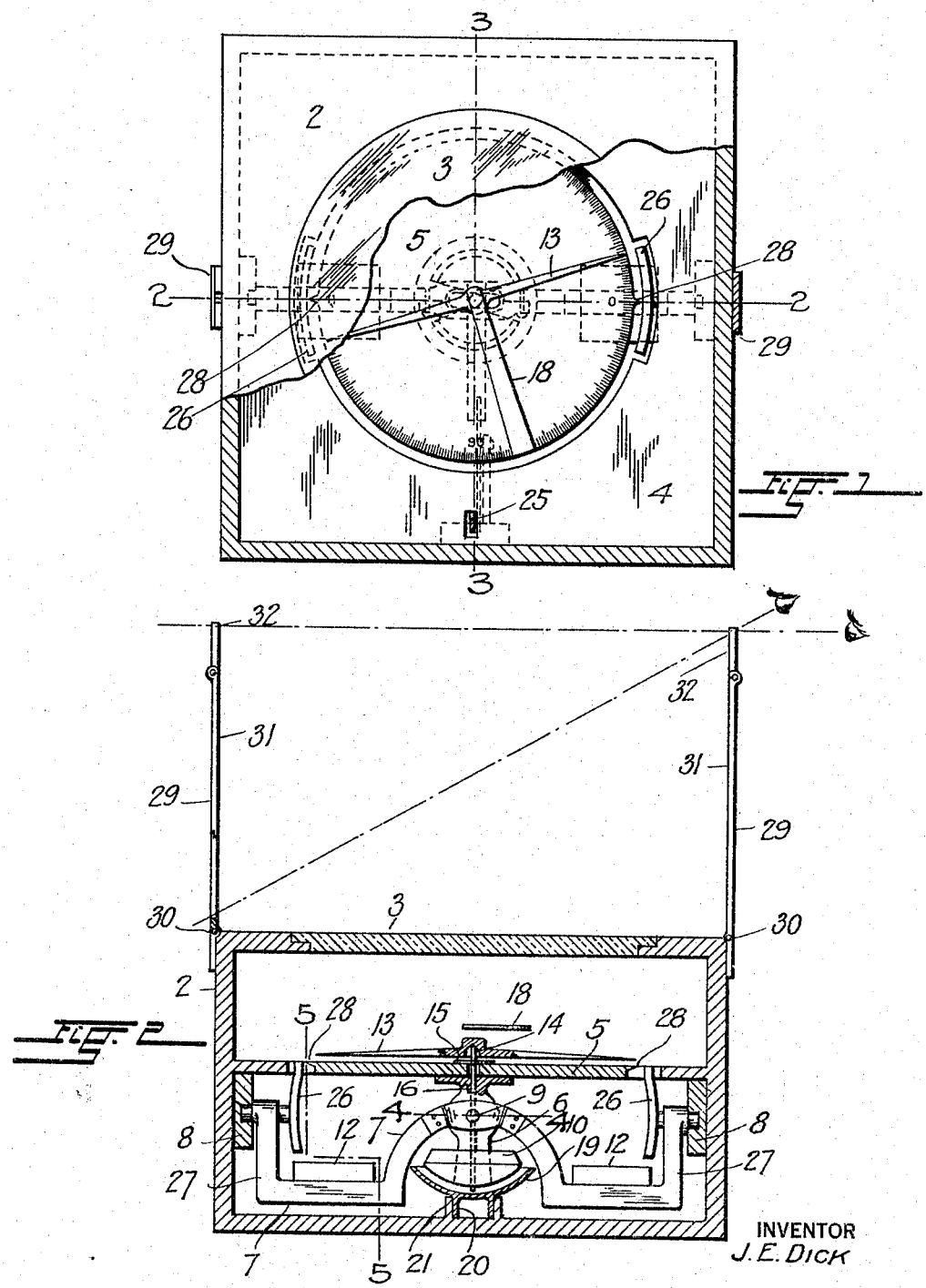
INVENTOR
J. E. DICK J. E. DICK.
HAND TRANSIT.
APPLICATION FILED MAY 23, 1918.
1,308,050.
Patented July 1, 1919.
2 SHEETS—SHEET 2.
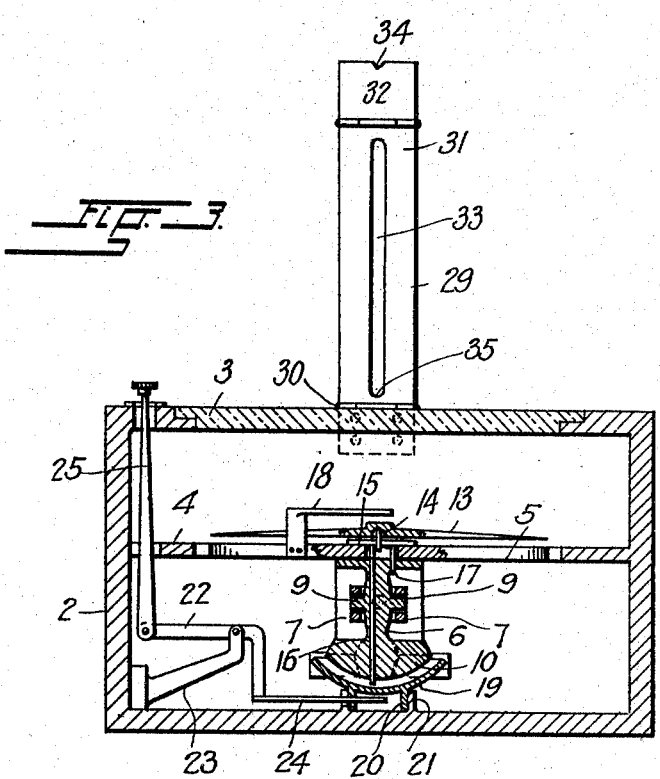
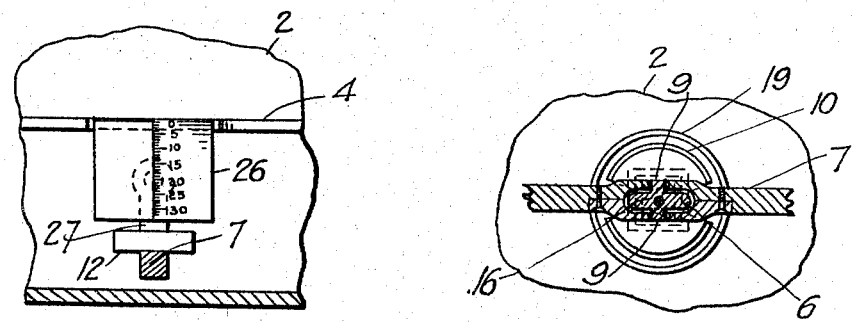
INVENTOR
J. E. DICK
BY
ATTORNEY

UNITED STATES PATENT OFFICE.

JAMES E. DICK, OF DENVER, COLORADO.

HAND-TRANSIT.

1,308,050.  Specification of Letters Patent.  Patented July 1, 1919.

Application filed May 23, 1918. Serial No. 236,176.

*To all whom it may concern:*

Be it known that I, JAMES E. DICK, a citizen of the United States, residing at Denver, in the county of Denver and State of Colorado, have invented certain new and useful Improvements in Hand-Transits, of which the following is a specification.

This invention relates to surveying instruments of the type commonly known as hand-transits or surveying compasses, and its primary object is to provide a portable surveying instrument of very simple construction which is adapted to measure both horizontal and vertical angles without the use of leveling means or a stationary support.

The instrument is particularly intended to be held in the hand of the surveyor and it is designed to accurately measure any horizontal angle and any vertical angle within a range sufficiently wide to adapt the instrument for use as an efficient substitute for the ordinary transit.

With the above and other objects in view, all of which will fully appear in the course of the following description, my invention consists of the features of construction and combinations of parts, an embodiment of which has been shown in the accompanying drawings in which like characters of reference designate corresponding parts throughout the several views, and in which Figure 1 represents a partially sectional plan view of the instrument, Fig. 2, a section taken on the line 2—2, Fig. 1, Fig. 3, a section on the line 3—3, Fig. 1, Fig. 4, a horizontal section along the line 4—4, Fig. 2, and Fig. 5, a face view of one of the scale plates bearing the graduated vertical arcs along which the vertical angles are measured, taken on the line 5—5, Fig. 2.

Referring to the drawings, the reference character 2 designates a compass-box of suitable proportions which in the center of its top has a circular opening covered by a plate of glass 3.

A horizontal partition 4 having a circular opening axially alined with that in the top of the box, provides a frame for a dial 5 which when the box occupies a horizontal position lies in the plane of the upper surface thereof.

The dial has a central shank 6 for its oscillatory connection with a yoke 7 which is suspended at its ends in bearings 8 at opposite sides of the box, to swing about a horizontal axis.

The yoke has a central passage to receive the shank of the dial which is supported on the yoke to swing about an axis transverse to the axis of oscillation thereof, by means of trunnions 9 loosely fitting in openings at opposite sides of the passage.

The shank has at its lower end a weight 10 provided with indentations to admit the adjacent portions of the yoke in its oscillatory motion and the yoke is likewise provided with weights 12 which are preferably arranged at opposite sides of the axis of the dial.

The several weights coöperate to constantly maintain the dial in a horizontal position, irrespective of the position of the box, it being understood that the supporting means whereby the dial is enabled to swing about two axes extending at right angles to each other, provides a universal joint which permits of angular motion of the box in any direction without disturbing the position of the dial with relation to the horizontal.

A magnetic needle 13 which coöperates with a graduated circle on the margin of the dial is loosely supported upon a point 14 which extends in the axis of the dial from a small disk 15 normally resting upon the upper surface of the same.

A slender rod 16 on the disk extends loosely through a longitudinal bore of the shank and projects beyond the lower surface of its weighted end, and a shorter rod or pin 17 extending in a bore of the shank, parallel to the other, secures the disk against rotation.

An arm 18 fastened at the periphery of the dial and extending over the central portion of the compass-needle provides a stop which in the operation of the instrument serves to hold the needle in a condition of rest.

A cup 19 axially alined with the shank of the dial is upwardly adjustably supported beneath the weight thereof.

The cup has to this end a central foot 20 which is slidably fitted in a socket 21 formed in the center of the bottom of the compass-box.

A bell-crank 22 fulcrumed on a bracket 23 which extends inwardly from a side of the box, carries at the end of one of its arms, a rod 24 which projects through a slot in the socket, into an aperture of the foot of the cup.

The opposite arm of the bell-crank is pivotally connected with a push-rod 25 which extends loosely through an opening in the top-plate of the box.

The bottom surface of the weight on the shank of the dial is convex in conformity with the inner concave surface of the cup 19 which is normally spaced therefrom.

When in the operation of the instrument it is desired to clamp the dial and its rotary needle in fixed relation to each other and the compass box, in order to determine the readings on the graduated circle of the dial and on the graduated vertical arcs hereinafter to be described, the operator presses the push-rod inward and thereby moves the cup into engagement successively with the protruding end of the rod 16 of the needle-support and the convex surface of the weight on the dial-shank.

The consequent engagement of the needle with the superposed stop and the frictional contact between the cup and bottom surface of the weight 10 causes both the dial and the needle to be fixed in the positions they occupy with relation to each other and the compass-box.

The graduated vertical arcs hereinbefore referred to are placed upon the inner surfaces of two plates 26 which are fastened at points diametrically opposite with relation to the axis of the dial, to the upwardly extending end-portions 27 of the oscillating yoke 7.

The dial has marginal pointers 28 which coöperate with the scales on the plates 26 to indicate the vertical angles, and the faces of the plates are curved in the circle of the movement of the dial about its axis on the yoke.

It will be seen that by the above-described arrangement on the vertical scale-plates and the dial, the pointers of the latter will always move in proper relation to the scales irrespective of the position of the box relative to the constantly horizontal parts of the instrument.

Two coöperative sight-posts 29 extend upwardly from opposite sides of the compass-box at the ends of an imaginery line passing through the axis of the dial.

The posts are connected with the box by hinge-joints 30 and are each composed of two hinged sections 31 and 32 so that they may be folded upon the top of the box when not in use.

The posts are provided with longitudinal sight-slots 33 and with notch-sights 34 which are vertically alined with the respective slots, in the upper edges of the same.

The lower edges 35 of the slots are arranged with relation to the sights 34 so that a line drawn from the sight of either post through the edge 35 of the slot in the other post extends at a predetermined angle to the sight-line of the instrument passing through the notch-sights.

The purpose of this arrangement is to provide a simple and ready means for augmenting the angle measured on one or the other of the vertical arcs, by an angle of predetermined value and thereby increase the range of the instrument in its use as a gradienter.

In the operation of my improved instrument, the operator holding the box, sights at a distant object along the notch-sights 34. The position of the magnetic needle relative to the graduated circle on the dial denotes the horizontal angle between the sight-line passing through the object and a pre-established line, and the position of one of the pointers 28 on the dial relative to the corresponding vertical arc denotes the elevation of the object with relation to the point of observation, by measuring the degree of inclination of the imaginary line passing through the sights of the instrument and the object, as compared with the horizontal.

In case the angle of inclination exceeds the maximum of either vertical scale, the operator sights at the object along a line passing through the sight of the near sight-post of the instrument and the end of the slot in the far sight-post, and adds to the known angle between this line and the sight line of the instrument, the angle measured on the vertical scale, it being understood that in every position of the instrument, the floating dial and its magnetic needle remain constantly in a horizontal position.

As soon as the operator's line of vision intersects the distant object, and the needle comes to rest, the push-rod is pressed inwardly to lock the operative parts of the instrument against relative movement.

With the parts in this condition, the operator can readily read the measured angles through the glass-covered opening of the box.

Having thus described the instrument in the best form at present known to me, I desire it understood that variations in the construction and arrangement of the coöperative parts thereof may be resorted to within the spirit of the invention as set forth in the following claims:

1. In an instrument of the character described, the combination with a support and means thereon for sighting along a determinate line, of a pivoted dial balanced on the support to maintain a horizontal position, a magnetic needle coöperating therewith, a vertical scale on the support for measuring the angular position of the sight-line relative to the horizontal, and a pointer on the dial coöperating with the scale.

2. In an instrument of the character described, a support, sight-members thereon establishing a determinate line of sight, a vertical scale on the support for measuring the angular position of the sight-line relative to the horizontal, and a pivoted pointer coöperating with the scale and balanced to maintain a horizontal position, one of the sight-members having an auxiliary sight disposed to establish in conjunction with the other member, a second sight-line at an angle of determinate value.

3. In an instrument of the character described, a support, sight-members thereon establishing a determinate line of sight, a vertical scale on the support for measuring the angular position of the sight line relative to the horizontal, a universally pivoted dial on the support, a magnetic needle coöperating therewith, and a pointer on the dial coöperating with the vertical scale, one of the sight-members having an auxiliary sight disposed to establish in conjunction with the other member, a second sight-line at a vertical angle of determinate value.

4. In an instrument of the character described, the combination with a support and means thereon for sighting along a determinate line, of a universally pivoted dial on the support, a magnetic needle coöperating therewith, and mechanism for fixing the dial and the needle with relation to the sight-line.

5. A hand-transit comprising a compass-box, coöperating sights thereon, a yoke suspended in the box to swing about a determinate axis, a dial pivoted on the yoke to swing about an axis at right angles to the other and balanced to maintain a horizontal position, and a magnetic needle coöperating with the dial.

6. A hand-transit comprising a compass-box, coöperating sights thereon, a yoke suspended in the box to swing about a determinate axis, a dial pivoted on the yoke to swing about an axis at right angles to the other and balanced to maintain a horizontal position, a magnetic needle coöperating with the dial, a vertical scale fixed on the yoke to measure the angular position of the sight line of the transit relative to the horizontal, and a pointer on the dial coöperating with the scale.

7. A hand-transit comprising a compass-box, coöperating sights thereon, a yoke suspended in the box to swing about a determinate axis, a dial having a weighted shank pivoted on the yoke to swing about an axis at right angles to the other, a needle-support having a rod extending beyond the lower end of the shank, a magnetic needle on the support, a stop above the needle, a clamping member coöperating with the stop to fix the dial and the needle with relation to the box by engagement with the lower ends of the rod and the shank, and means to effect an adjustment of the clamping-member.

8. A hand-transit comprising a compass-box, coöperating sights thereon, a yoke suspended in the box to swing about a determinate axis, a dial having a weighted shank pivoted on the yoke to swing about an axis at right angles to the other, a magnetic needle supported above the dial, a stop above the needle, a clamping member coöperating with the stop to fix the dial and the needle with relation to the box, and means to effect an adjustment of the clamping member.

9. A hand-transit comprising in combination with a suitable support, two sight-posts having sights to establish a determinate line of sight, a vertical scale to measure the angular position of the sight-line relative to the horizontal, and a pivoted pointer coöperating with the scale and balanced to maintain a horizontal position, one of the sight-posts having a second sight disposed to establish in conjunction with the sight of the other post, a second sight-light at an angle of determinate value, to the other.

10. A hand-transit comprising in combination with a suitable support, two sight-posts having sights to establish a determinate line of sight, a vertical scale to measure the angular position of the sight-line relative to the horizontal, a universally pivoted dial, a magnetic needle coöperating therewith, and a pointer on the dial coöperating with the scale, one of the sight-posts having a second sight disposed to establish in conjunction with the sight of the other post, a second sight-line at an angle of determinate value, to the other.

11. An instrument of the character described comprising a movable compass-box, means thereon for sighting along a determinate line, a universally pivoted dial in the box and a magnetic needle coöperative with the dial.

In testimony whereof I have affixed my signature.

JAMES E. DICK.

Copies of this patent may be obtained for five cents each, by addressing the "Commissioner of Patents, Washington, D. C."